J. V. ROBINSON.
AUTOMATIC TRAIN PIPE COUPLING.
APPLICATION FILED OCT. 1, 1914. RENEWED SEPT. 13, 1917.

1,245,797.

Patented Nov. 6, 1917.
3 SHEETS—SHEET 1.

Witnesses

Inventor
Joseph V. Robinson
Attorney

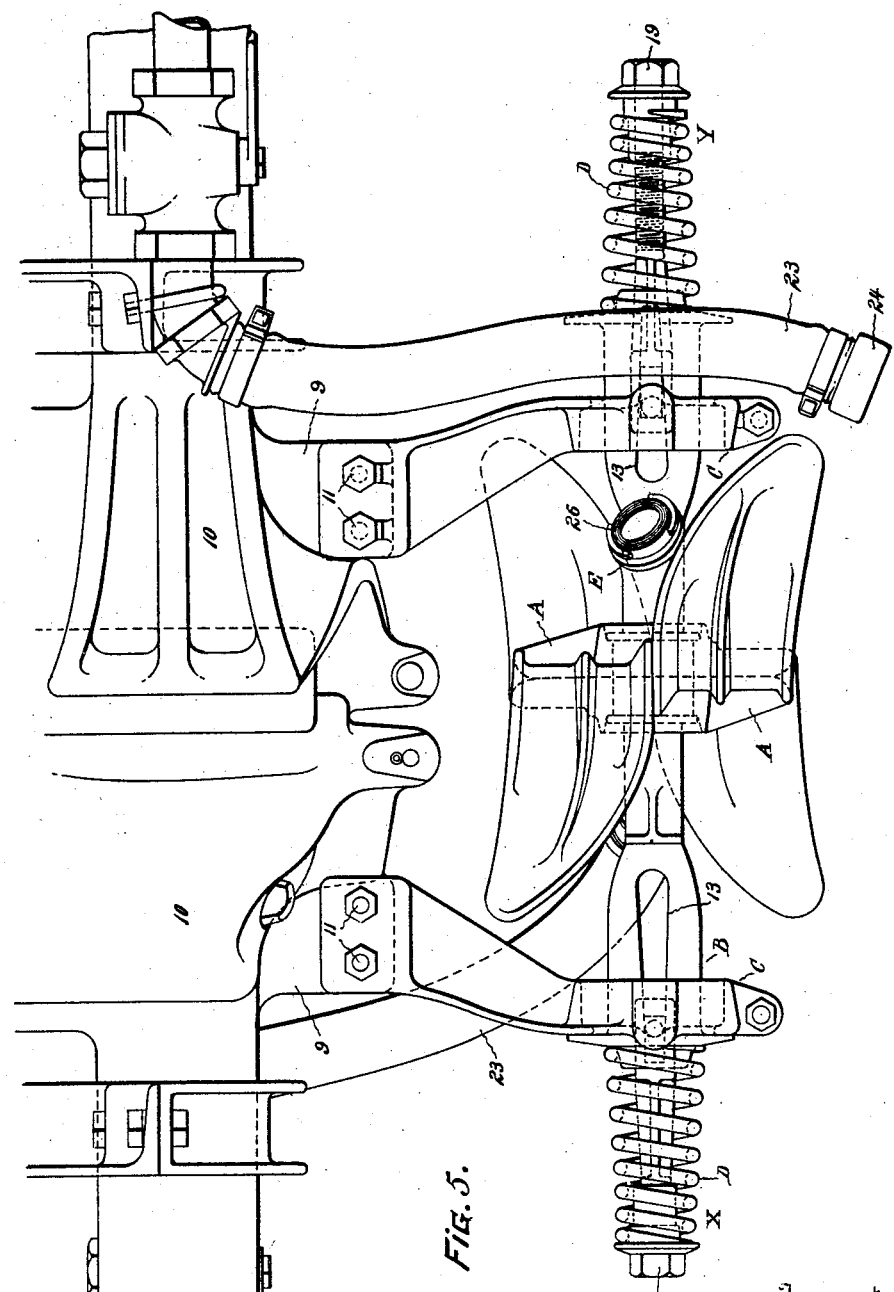

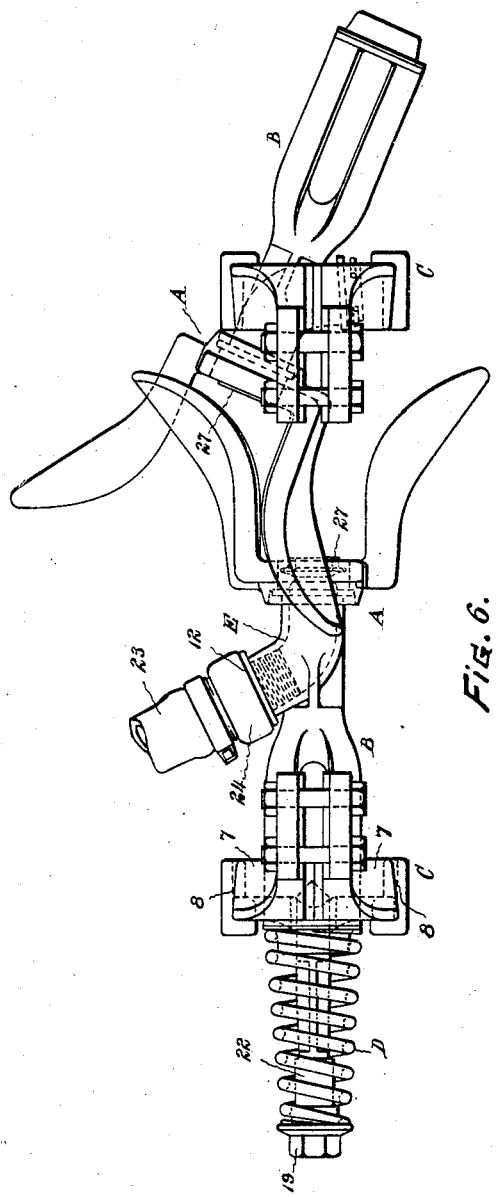

UNITED STATES PATENT OFFICE.

JOSEPH V. ROBINSON, OF BRANFORD, CONNECTICUT.

AUTOMATIC TRAIN-PIPE COUPLING.

1,245,797. Specification of Letters Patent. Patented Nov. 6, 1917.

Application filed October 1, 1914, Serial No. 864,464. Renewed September 13, 1917. Serial No. 191,313.

*To all whom it may concern:*

Be it known that I, JOSEPH V. ROBINSON, a citizen of the United States, and a resident of Branford, county of New Haven, State of Connecticut, have invented certain new and useful Improvements in Automatic Train-Pipe Couplings, of which the following is a specification.

The object of my invention is to produce an improved means for renewing defective gaskets between the faces of coupled train pipe couplings without first uncoupling the cars. The constructions heretofore by which this has been accomplished add extra parts to and complicate the coupling. In addition, some expose the operator to an element of danger and are susceptible to leaks unless great care be exercised by the trainmen in manipulating them.

The object of the present invention is to obviate these objections and produce a simple, efficient means for renewing defective gaskets which does not add any extra parts to the coupling and is safe and efficient.

To this end my invention consists in the combinations, arrangements and constructions hereinafter described, pointed out in the appended claims, and illustrated in the accompanying drawings, in which:

Fig. 5, is a side elevation of a pair of automatic couplings provided with my improvement, coupled up in service; one of the couplings being shown in one of the positions to which it is shifted in renewing a defective gasket, and Fig. 6, is a plan view of the construction illustrated in Fig. 5, showing one of the couplings in the final adjusted position. The spring of the adjusted connector is omitted.

Figure 1:
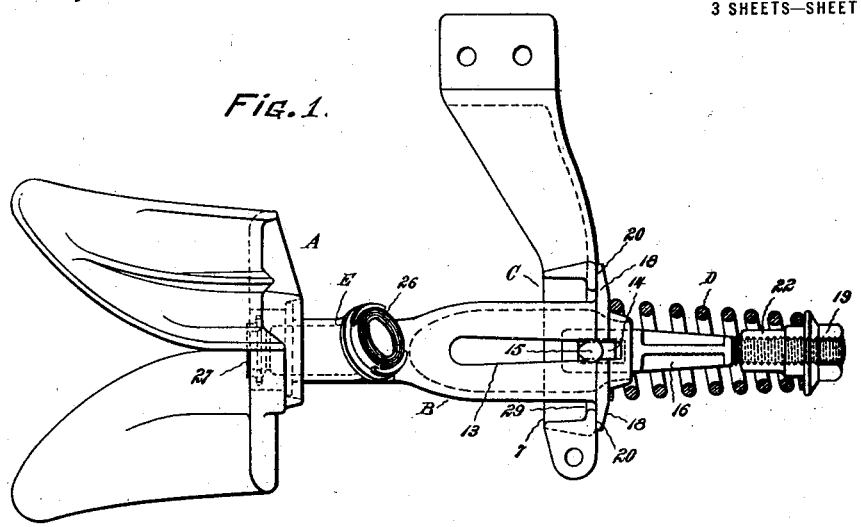
Figure 1, is a side view of an automatic train pipe coupling provided with my improvement, some of the parts being shown in elevation and some in section.
Figure 2:
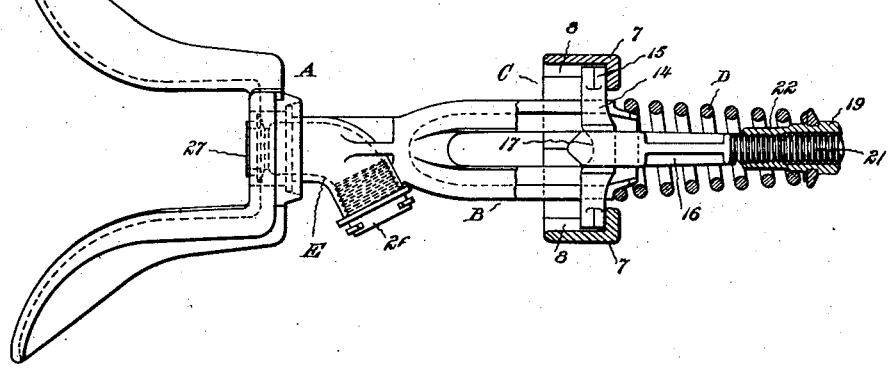
Fig. 2, is a horizontal section of the structure shown in Fig. 1.
Figure 3:
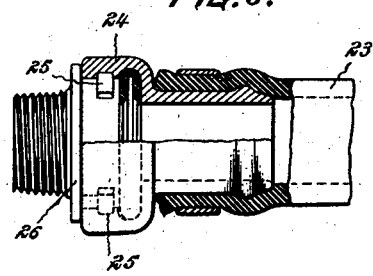
Fig. 3, is a detail section of the union for securing the usual train pipe hose to the automatic coupling.
Figure 4:
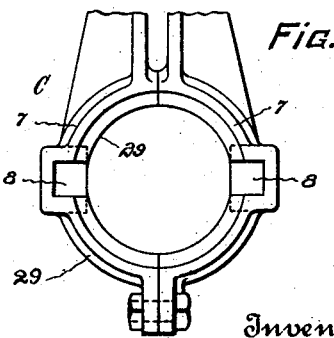
Fig. 4, is a face view of the base of my improvement.

Referring to the drawings and particularly to Figs. 1 and 2, I show my improvement applied to a well-known type of train pipe connector comprising a coupling head A, a body member B, a base C, and a spring D, suitably connected with one another and arranged for efficient operation. The base C consists of halves 7, each provided with an elongated bearing 8, the halves being bolted together about the body member B, and secured to a lug 9, of the usual car coupler 10, by bolts 11.

The member B carries a curved conduit E which extends through said head and receives the usual train pipe hose in any suitable manner preferably in the manner hereinafter described. A slot 13, extends through the sides of the member B and receives a pivot bar 14 having ends 15 which project outwardly from the sides of the member B into the bearings 8 of the base C. A tie rod 16 is suitably journaled on the pivot bar at 17 and extends rearwardly of the member B and the base. Surrounding the tie rod and bearing against the rear face of projections 18 on the member B is the spring D. A nut or abutment 19 screwed on to the rear end of the tie rod maintains the spring under slight initial compression against the projection 18, whereby the projections are firmly pressed against the rear face 20 of the base C, thus yieldingly supporting the coupling head A. This construction permits free universal movement of the coupling head and operates to place it under pressure in coupling, effecting an efficient air-tight joint between the gaskets of mating heads. The various parts are, of course, proportioned to give the required strength and range of movement to successfully negotiate all the conditions of service.

In further carrying out my improved means of renewing defective gaskets, I thread the tie rod 16 at 21 for a considerable distance and provide the nut 19 with a sleeve or stem 22 threaded to mate with the threads of the tie rod. To effect the renewal of a defective gasket, the usual train pipe hose 23 is disconnected from the conduit E of the member B by giving the hose a quarter turn which will free its member 24 from the lugs 25 of a fitting 26 in the connector, whereupon the nut 19 is shifted rearwardly on the tie rod 16 from the position shown at X in Fig. 5 to the position shown at Y in the same figure which frees the gaskets 27 of the coupling heads from the pressure of the springs D.

Further rearward movement of the nut 19 will back it off the tie rod whereupon the coupling head A and the member B may be shifted to the position shown in Fig. 6.

from which position the gasket 27 mounted in the conduit E may be readily removed and a new one substituted without uncoupling the cars. The reverse of the foregoing operation will put the connectors back into their normal coupled position.

In renewing a defective gasket it may be found desirable to remove the pivot bar 14 from the base C by shifting it forwardly out of the bearings 8 and laterally through the slot 13 out of the body member B, and thus allow greater rearward movement of the coupling head A. In Fig. 6 the pivot bar has been thus removed. By leaving the bottom 29 of the base open, the member B may be completely removed therefrom when the pivot bar has been taken out, in the manner described.

The foregoing construction provides a simple and efficient means of renewing defective gaskets without uncoupling cars which is safe to operate and inexpensive to make. Various detail changes may of course be made in the proportion and arrangement of the parts but I have shown the most satisfactory form known to me.

Asking therefore not to be limited to the exact construction disclosed, what I claim as new and desire to secure by United States Letters Patent is:

1. In an automatic train pipe coupling, the combination of a coupling head, a support therefor comprising a base and a resilient member, said member being normally under compression and operating to project said head forwardly of said base, and means for gradually freeing said member of said compression and permitting movement thereof longitudinally of said base when said head is coupled up in service, whereby the faces of mated coupling heads may be separated for the purpose described.

2. In an automatic train pipe coupling, the combination of a coupling head, a support therefor comprising a base and a spring, said spring being normally under compression and operating to project said head forwardly of said base, and means for gradually freeing said spring of said compression and for permitting movement thereof longitudinally of said base when said head is coupled up in service, whereby the faces of mated coupling heads may be separated for the purpose described, said means consisting of an abutment for said spring.

3. In an automatic train pipe coupling, the combination of a coupling head, a base, a stem extending from said head through said base, a fluid conduit connected with said stem, a spring resting on the stem in rear of said conduit, said spring being normally under compression and acting to project said head forwardly of said base, and means for freeing said spring of said compression and for permitting gradual adjustment of the spring longitudinally of said base when said head is coupled up in service, whereby the faces of coupled heads may be separated for the purpose described.

4. In an automatic train pipe coupling, the combination of a coupling head, a stationary base through which the body of the coupling head extends, a coiled spring arranged between an abutment carried by the base and a member of the coupling head to project the head forward of the base, the spring abutment connected with the base being adjustable relative to the base and accessible at all times, whereby the head may be relieved from the pressure of the spring and the faces of coupled heads separated while the cars carrying the couplers are connected.

5. In an automatic train pipe coupling, the combination of a coupling head, a base, a member extending from said head through said base, a fluid conduit connected with said member, a rod extending rearwardly from said base, a spring surrounding said rod and bearing against said member at the rear of the base, said spring being maintained in position under initial compression, and means for freeing said spring of said compression to permit said head to be shifted rearwardly toward said base whereby the faces of coupled heads may be separated to remove a defective gasket without first uncoupling the cars.

6. In an automatic train pipe coupling, the combination of a coupling head, a stationary base through which the body of the coupling head extends, a rod connected with the base and extending rearwardly therefrom, a sleeve mounted on and having threaded engagement with the rod, and a coil spring arranged between an abutment carried by said sleeve and an abutment carried by the head, said sleeve being adapted to be adjusted longitudinally of the rod at all times, substantially as and for the purpose described.

7. In an automatic train pipe coupling, the combination of a coupling head, a base, a stem extending from said head through said base, a rod pivotally connected with said base and extending rearwardly beyond the rear end of said stem, a spring surrounding said rod and bearing against said stem, and a sleeve threadingly connected with said rod for placing said spring under compression and accessible at all times for permitting removal of said head from the coupled service position without first uncoupling the cars.

8. In an automatic train pipe coupling, the combination of a coupling head, a base, a stem extending from said head through said base, a rod pivotally connected with said base and extending rearwardly beyond the rear ends of the coupling head and said stem, a spring surrounding said rod and bearing against said stem, and a device threadingly connected with said rod for shifting said spring longitudinally of said base, whereby said head may be removed from the coupled service position and returned to such position without uncoupling the cars.

9. In an automatic train pipe coupling, the combination of a coupling head, a conduit extending rearwardly thereof, a base, a member projecting from said conduit through said base and carrying a projection, a stem pivoted in said base and extending rearwardly thereof axially of said member, a spring surrounding said stem and bearing against said projection, an abutment against which the rear end of said spring rests, said abutment being screwed on to said stem and adapted to permit shifting of said head rearwardly from the coupled position to effect the renewal of a defective gasket.

10. In an automatic train pipe coupling, the combination of a coupling head, a fluid conduit terminating between said head and base, a hose connected with said conduit, means for permitting ready disconnection of the hose from said conduit, a member connected with the conduit and extending through said base, a projection on said member, a rod pivotally connected with the base and projecting rearwardly therefrom, a spring surrounding said rod and bearing against said projection to sustain said head in the coupling position, and means threaded on to said rod for permitting shifting of said head from the coupled service position while the cars are coupled, whereby the face of coupled heads may be exposed for repairs.

11. In an automatic train pipe coupling, the combination of a coupling head, a base provided with an elongated bearing, a fluid conduit for said head connected with a member which extends through said base, a bar extending through an opening in said member into said bearing, the bearing being open at one end to permit assembly of the bar therein from the front of said base, a rod pivotally connected to said bar and extending rearwardly of the base, a spring surrounding said rod and pressing said projection against the rear face of said base to support said head, and means for shifting said spring longitudinally of said rod whereby said bar may be removed from said bearing without disturbing said base.

In testimony whereof, I have here into set my hand in the presence of two witnesses.

JOSEPH V. ROBINSON.

In the presence of—
M. C. SHERIDAN.
KATHERINE V. BOSWELL.